United States Patent
Park (10) Patent No.: US 9,988,972 B2
(45) Date of Patent: Jun. 5, 2018

(54) HYBRID INTERCOOLER SYSTEM USING MULTIPLE COOLING MEDIA AND METHOD OF CONTROLLING THE HYBRID INTERCOOLER SYSTEM USING MULTIPLE COOLING MEDIA

(71) Applicant: HYUNDAI MOTOR COMPANY, Seoul (KR)

(72) Inventor: Dang-Hee Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 137 days.

(21) Appl. No.: 15/136,050

(22) Filed: Apr. 22, 2016

(65) Prior Publication Data

US 2017/0082014 A1    Mar. 23, 2017

(30) Foreign Application Priority Data

Sep. 21, 2015  (KR) .................. 10-2015-0133067

(51) Int. Cl.
  *F02B 29/04*   (2006.01)
  *F02B 33/00*   (2006.01)

(52) U.S. Cl.
  CPC ...... *F02B 29/0412* (2013.01); *F02B 29/0425* (2013.01); *F02B 29/0443* (2013.01); *F02B 29/0493* (2013.01); *Y02T 10/146* (2013.01)

(58) Field of Classification Search
  CPC .............. F02B 29/0412; F02B 29/0425; F02B 29/0443; F02B 29/0493; Y02T 10/146
  USPC ........................................... 60/599; 123/563
  IPC ....................................... F02B 19/04
  See application file for complete search history.

(56) References Cited

U.S. PATENT DOCUMENTS

| | | | | |
|---|---|---|---|---|
| 2,583,651 A | * | 1/1952 | Horning, Jr. ............ | F02B 71/06 123/41.64 |
| 3,397,684 A | * | 8/1968 | Scherenberg ....... | F02B 29/0412 60/599 |
| 4,059,080 A | * | 11/1977 | Rudert ..................... | F01P 11/10 123/563 |
| 4,317,439 A | * | 3/1982 | Emmerling ......... | F02B 29/0412 60/599 |
| 4,362,131 A | * | 12/1982 | Mason ................ | F02B 29/0443 123/41.31 |
| 4,513,695 A | * | 4/1985 | Patchen, II ......... | F02B 29/0443 123/563 |
| 5,036,668 A | * | 8/1991 | Hardy ................. | F02B 29/0412 60/599 |
| 6,561,169 B2 | * | 5/2003 | Sealy .................. | F02B 29/0443 123/563 |
| 6,604,515 B2 | * | 8/2003 | Marsh ................. | F02B 29/0443 60/599 |

(Continued)

FOREIGN PATENT DOCUMENTS

| | | | | |
|---|---|---|---|---|
| DE | 2523436 A1 | * | 12/1976 | ................ F01P 7/16 |
| EP | 2037200 A2 | * | 3/2009 | ........... F28D 1/0435 |

(Continued)

*Primary Examiner* — Thai Ba Trieu
(74) *Attorney, Agent, or Firm* — McDermott Will & Emery LLP (57) ABSTRACT

A hybrid intercooler system using multiple cooling media includes a first cooler for cooling air supercharged in a turbocharger using transmission oil, a second cooler for cooling the supercharged air passing through the first cooler using cooling water, and a third cooler for cooling the supercharged air passing through the second cooler using outdoor air.

10 Claims, 6 Drawing Sheets

(56) References Cited

U.S. PATENT DOCUMENTS

| | | | | |
|---|---|---|---|---|
| 6,647,934 B2 * | 11/2003 | Marsh | ................. | F02B 29/0443 |
| | | | | 60/599 |
| 6,772,715 B2 * | 8/2004 | Pfeffinger | ................. | F01P 3/20 |
| | | | | 123/41.31 |
| 6,796,134 B1 | 9/2004 | Bucknell et al. | | |
| 6,883,314 B2 * | 4/2005 | Callas | ................. | F02B 29/0412 |
| | | | | 60/599 |
| 7,040,303 B2 * | 5/2006 | Uzkan | ................. | F02B 29/0412 |
| | | | | 60/599 |
| 7,254,947 B2 * | 8/2007 | Burk | ................... | F02B 29/0443 |
| | | | | 60/599 |
| 7,454,896 B2 * | 11/2008 | Chalgren | ............ | F02B 29/0493 |
| | | | | 60/599 |
| 7,685,816 B2 * | 3/2010 | Yabuki | .................... | F01P 7/044 |
| | | | | 60/456 |
| 7,958,854 B2 * | 6/2011 | Al-Shawaf | ............ | F28D 1/0435 |
| | | | | 60/599 |
| 8,826,893 B2 * | 9/2014 | Marsh | ................. | F02B 29/0412 |
| | | | | 60/599 |
| 2003/0033993 A1 * | 2/2003 | Valaszkai | ............ | F02B 29/0412 |
| | | | | 60/599 |

FOREIGN PATENT DOCUMENTS

| | | |
|---|---|---|
| JP | H0510116 A | 1/1993 |
| JP | H09-269046 A | 10/1997 |
| JP | H10238341 A | 9/1998 |
| JP | 2009-068809 A | 4/2009 |
| KR | 1995-0009398 Y1 | 10/1995 |
| KR | 100387424 B1 | 6/2003 |
| KR | 10-2007-0118221 A | 12/2007 |
| SU | 1740717 A1 * | 6/1992 |

* cited by examiner

HYBRID INTERCOOLER SYSTEM USING MULTIPLE COOLING MEDIA AND METHOD OF CONTROLLING THE HYBRID INTERCOOLER SYSTEM USING MULTIPLE COOLING MEDIA

CROSS-REFERENCE TO RELATED APPLICATIONS

This application claims the benefit of priority to Korean Patent Application No. 10-2015-0133067, filed on Sep. 21, 2015 with the Korean Intellectual Property Office, which is incorporated herein by reference in its entirety.

TECHNICAL FIELD

Exemplary embodiments of the present disclosure relate to a hybrid intercooler system using multiple cooling media and a method of controlling the hybrid intercooler system using multiple media, and more particularly, to a hybrid intercooler system using multiple cooling media and a method of controlling the same capable of maximizing engine power and fuel efficiency performance.

BACKGROUND

Generally, a turbocharger has a supercharging structure in which it compresses intake air supplied to an engine using power of exhaust gas, and supplies the compressed intake air to a cylinder to increase intake air charging efficiency and increase an average effective pressure, thereby increasing engine output.

The turbocharger has a structure in which a general compressor and a turbine are disposed on an axis and the turbine is rotated by the power of exhaust gas discharged through an exhaust pipe and rotates the compressor disposed on the axis with the turbine, thereby compressing air introduced through an intake manifold and supplying the compressed air to the cylinder.

Figure 1:
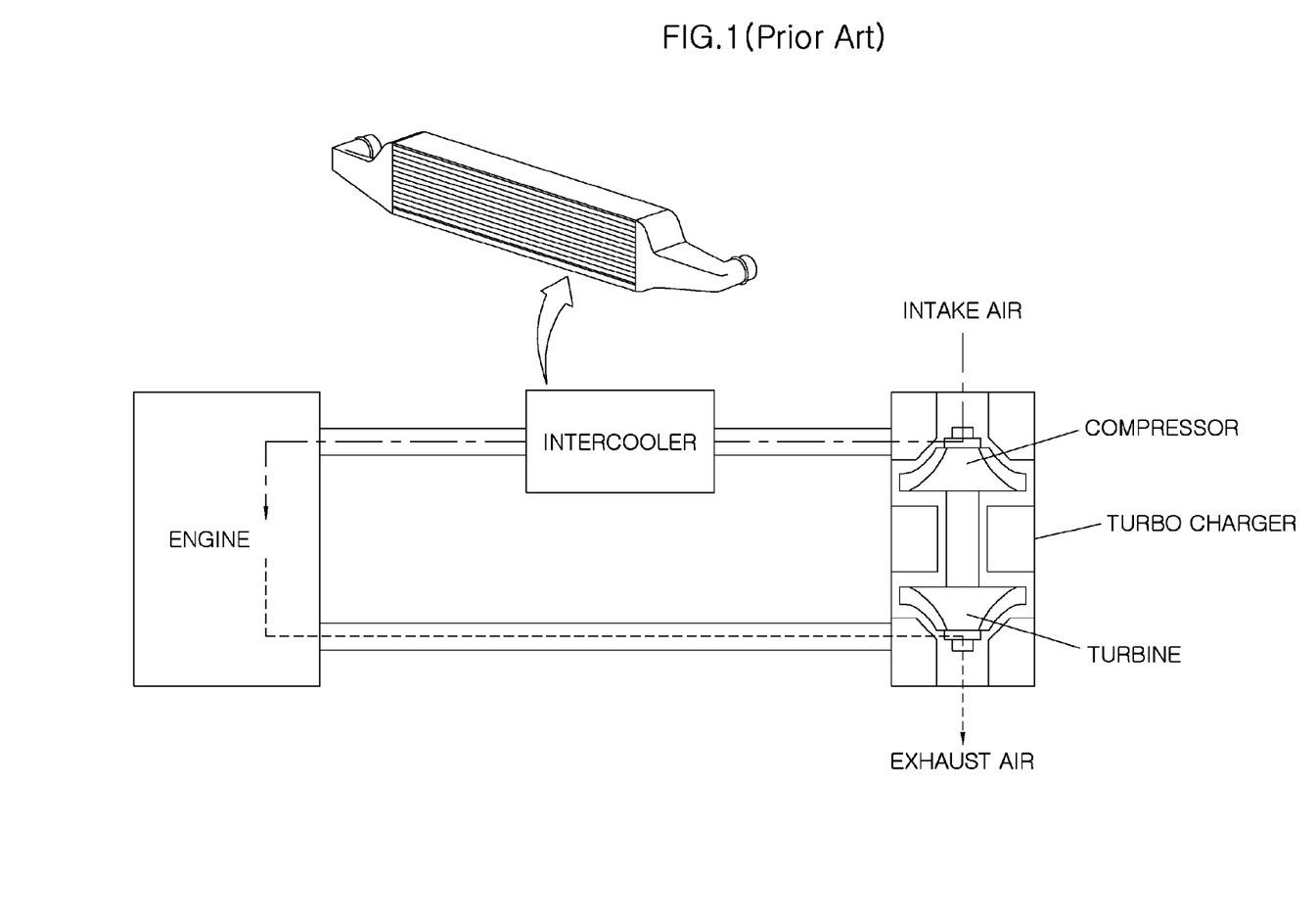
FIG. 1 is a diagram describing an existing intercooler.

During this process, the air compressed by the turbocharger increases in temperature. If the warmed air is supplied to a combustion chamber, an increase ratio of air density is reduced and charging efficiency may be reduced or knocking may occur. To lower the temperature of supercharged air, an intercooler is provided. FIG. 1 is a diagram illustrating an existing intercooler. Referring to FIG. 1, the intake air cooled while passing through the intercooler is maintained at a high density and is cooled to improve combustion power.

Intercoolers are generally classified into an air cooling type and a water cooling type, depending on a cooling method. The air cooling type intercooler has a structure in which it is cooled by cold air passing through a cooling fin integrally formed with the tube while the supercharged air passes through a plurality of tubes. The water cooling type intercooler has a structure in which cooling is accomplished by a cooling channel contacting the tube.

Generally, the air cooling intercooler has good cooling efficiency but has difficulty in achieving stable efficiency due to changes in outdoor temperature, etc. Further, the water cooling type intercooler may maintain stable efficiency, but has a problem in that cooling efficiency is more reduced than that of the air cooling type.

SUMMARY OF THE DISCLOSURE

An embodiment of the present disclosure is directed to a hybrid intercooler system using multiple cooling media and a method of controlling the same capable of improving cooling efficiency of an intercooler by integrating an air cooling type intercooler with a water cooling type intercooler and using the multiple cooling media in the water cooling type intercooler.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a hybrid intercooler system using multiple cooling media includes: a first cooler for cooling air supercharged in a turbocharger by using transmission oil; a second cooler for cooling the supercharged air passing through the first cooler by using cooling water; and a third cooler for cooling the supercharged air passing through the second cooler using outdoor air.

The hybrid intercooler system using multiple cooling media may further include: a transmission oil cooler for cooling the transmission oil supplied into the first cooler.

The hybrid intercooler system using multiple cooling media may further include: a first transmission oil channel for connecting the transmission oil cooler to a transmission including an oil pump, and further include a first transmission oil inflow channel communicating between an outlet of the transmission oil cooler, and further include an inlet of the transmission and a first transmission oil outflow channel communicating between an outlet of the transmission and an inlet of the transmission oil cooler.

The hybrid intercooler system using multiple cooling media may further include: a second transmission oil channel branched from the first transmission oil channel to connect the transmission oil cooler to the first cooler, and further include a second transmission oil inflow channel communicating between the first transmission oil inflow channel and an inlet of the first cooler; and a second transmission oil outflow channel communicating between an outlet of the first cooler and the first transmission oil outflow channel.

The hybrid intercooler system using multiple cooling media may further include: an intercooler valve for opening and closing a channel through which the transmission oil is introduced from the transmission oil cooler to the first cooler in the second transmission oil channel.

The hybrid intercooler system using multiple cooling media may further include: a cooling radiator for cooling the cooling water supplied into an engine and the second cooler.

The hybrid intercooler system using multiple cooling media may further include: a cooling water channel including a cooling water inflow channel communicating between an outlet of the cooling radiator and an inlet of the second cooler and a cooling water outflow channel communicating between an outlet of the second cooler and an inlet of the cooling radiator.

The hybrid intercooler system using multiple cooling media may further include: an intercooler water pump disposed in a channel through which the cooling water is supplied from the cooling radiator to the second cooler in the cooling water channel to supply the cooling water to the second cooler.

The hybrid intercooler system using multiple cooling media may further include: a supercharged air temperature detector for measuring a temperature of the supercharged air at an outlet of the third cooler; a transmission oil temperature detector for measuring a temperature of the transmission oil discharged from the transmission oil cooler; and a cooling water temperature detector for measuring a temperature of the cooling water discharged from the cooling radiator.

The hybrid intercooler system using multiple cooling media may further include: a controller for controlling whether to open and close the intercooler valve and whether to operate the intercooler water pump according to information measured by the supercharged air temperature detector, the transmission oil temperature detector, and the cooling water temperature detector.

In accordance with another embodiment of the present disclosure, a method for controlling a hybrid intercooler system using multiple cooling media includes: a measurement starting step of starting measurement of a temperature of supercharged air at an outlet of a third cooler, a temperature of transmission oil discharged from a transmission oil cooler and a temperature of cooling water discharged from a cooling radiator; a first determining step of determining whether the temperature of the supercharged air at the outlet of the third cooler exceeds a preset temperature of the supercharged air; a second determining step of determining whether the temperature of the cooling water exceeds the temperature of the transmission oil, when the temperature of the supercharged air at the outlet of the third cooler exceeds the preset temperature of the supercharged air; and a first cooling step of cooling the supercharged air using the transmission oil, if it is determined that the temperature of the cooling water discharged from the cooling radiator exceeds the temperature of the transmission oil discharged from the transmission oil cooler.

The first cooling step may include: a step of circulating the transmission oil to the first cooler by stopping the operation of the intercooler water pump and opening the intercooler valve; a third determining step of circulating the transmission oil to the first cooler and then determining whether the temperature of the supercharged air at the outlet of the third cooler is less than the preset temperature of the supercharged air or whether the temperature of the cooling water discharged from the cooling radiator is less than the temperature of the transmission oil discharged from the transmission oil cooler; and a step of stopping circulating the transmission oil to the first cooler by closing the intercooler valve if it is determined that the temperature of the supercharged air at the outlet of the third cooler is less than the preset temperature of the supercharged air or that the temperature of the cooling water discharged from the cooling radiator is less than the temperature of the transmission oil discharged from the transmission oil cooler.

The method of controlling a hybrid intercooler system using multiple cooling media may further include: a second cooling step of cooling the supercharged air using the cooling water, if it is determined that the temperature of the cooling water discharged from the cooling radiator does not exceed the temperature of the transmission oil discharged from the transmission oil cooler.

The second cooling step may include: a step of circulating the cooling water to the second cooler by closing the intercooler valve and operating the intercooler water pump; a fourth determining step of circulating the cooling water to the second cooler and then determining whether the temperature of the supercharged air at the outlet of the third cooler is less than the preset temperature of the supercharged air or whether the temperature of the cooling water discharged from the cooling radiator exceeds the temperature of the transmission oil discharged from the transmission oil cooler; and a step of stopping circulating the cooling water to the second cooler by stopping the operation of the intercooler water pump if it is determined that the temperature of the supercharged air at the outlet of the third cooler is less than the preset temperature of the supercharged air or that the temperature of the cooling water discharged from the cooling radiator exceeds the temperature of the transmission oil discharged from the transmission oil cooler.

DETAILED DESCRIPTION

Terms and words used in the present specification and claims are not to be construed as a general or dictionary meaning but are to be construed meaning and concepts meeting the technical ideas of the present disclosure based on a principle that the inventors can appropriately define the concepts of terms in order to describe their own disclosures in best mode. Therefore, the configurations described in the exemplary embodiments and drawings of the present disclosure are merely most preferable embodiments but do not represent all of the technical spirit of the present disclosure. Thus, the present disclosure should be construed as including all the changes, equivalents, and substitutions included in the spirit and scope of the present disclosure at the time of filing this application. In the present specification, an overlapped description and a detailed description for well-known functions and configurations that may obscure the meaning of the present disclosure will be omitted. Hereinafter, preferred embodiments of the present disclosure will be described in detail with reference to the accompanying drawings.

Figure 2:
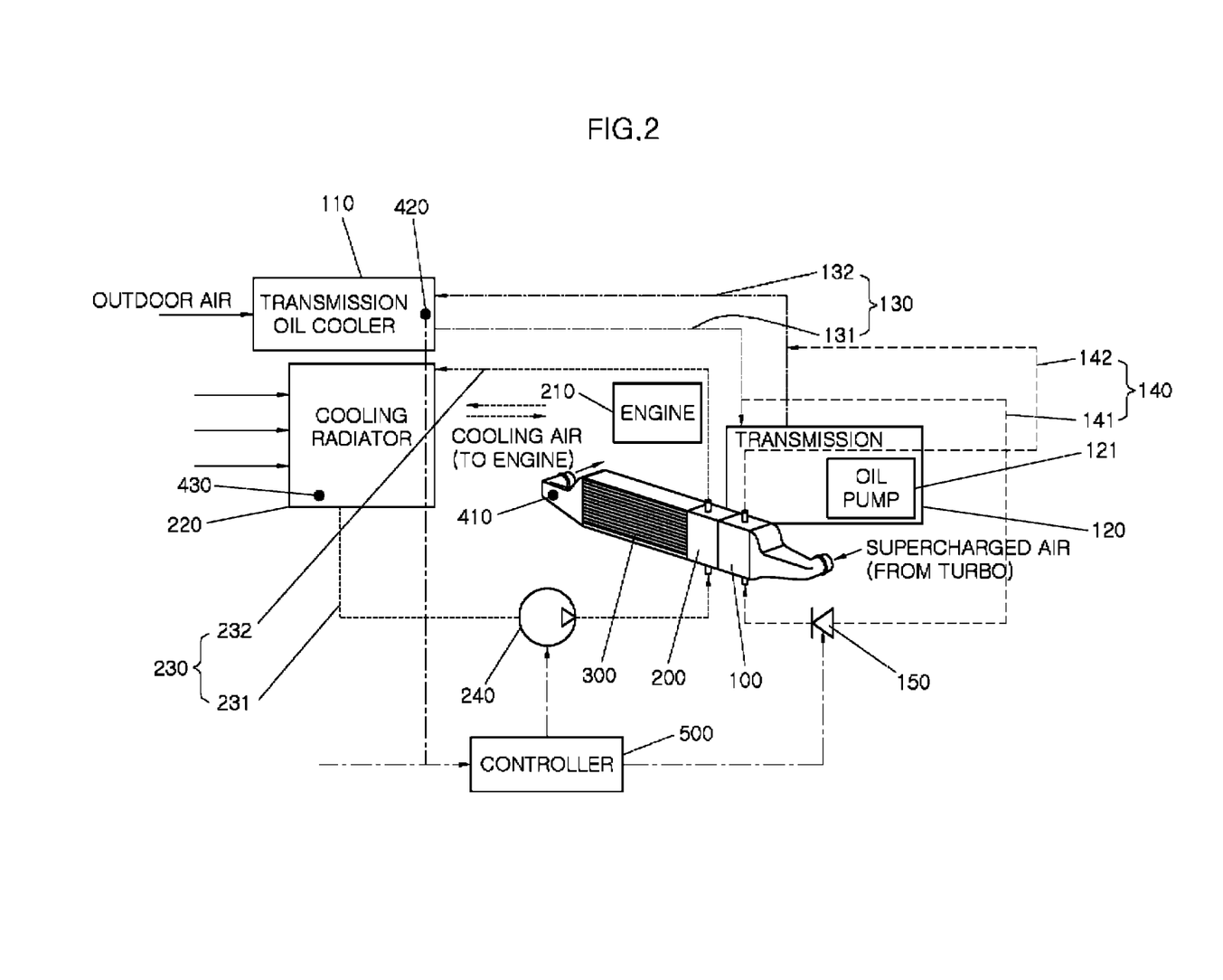
FIG. 2 is a block diagram of a hybrid intercooler system using multiple cooling media according to an exemplary embodiment of the present disclosure.

FIG. 2 is a block diagram of a hybrid intercooler system using multiple cooling media according to an exemplary embodiment of the present disclosure. Referring to FIG. 2, the hybrid intercooler system using multiple cooling media may include: a first cooler 100 configured to cool air supercharged in a turbocharger by using transmission oil; a second cooler 200 configured to cool the supercharged air passing through the first cooler using cooling water; and a third cooler 300 configured to cool the supercharged air passing through the second cooler using outdoor air.

The hybrid intercooler system using multiple cooling media may include: a transmission oil cooler 110 configured to cool transmission oil supplied into the first cooler 100; a first transmission oil channel 130 configured to connect the transmission oil cooler 110 to a transmission 120 including an oil pump 121; a second transmission oil channel 140 configured to be branched from the first transmission oil channel 130 to connect the transmission oil cooler 110 to the first cooler 100; and an intercooler valve 150 configured to open and close a channel through which transmission oil is introduced from the transmission oil cooler 110 to the first cooler 100 in the second transmission oil channel 140.

The first transmission oil channel 130 may include: a first transmission oil inflow channel 131 configured to communicate between an outlet of the transmission oil cooler 110 and an inlet of the transmission 120; and a first transmission oil outflow channel 132 configured to communicate between an outlet of the transmission 120 and an inlet of the transmission oil cooler 110.

Further, the second transmission oil channel 140 may include: a second transmission oil inflow channel 141 communicating between the first transmission oil inflow channel 131 and an inlet of the first cooler 100; and a second transmission oil outflow channel 142 communicating between an outlet of the first cooler 100 and the first transmission oil outflow channel 132.

When the first cooler 100 is not operated, the transmission oil cooled by the transmission oil cooler 110 may be introduced into the transmission 120 through the first transmission oil inflow channel 131 in the first transmission oil channel 130. Next, the transmission oil heated by the transmission 120 may be introduced into the transmission oil cooler 110 through the first transmission oil outflow channel 132 in the first transmission oil channel 130 by the oil pump 121. In this case, the intercooler valve 150 is closed and therefore the transmission oil inside the second transmission oil channel 140 may not be introduced or discharged.

On the other hand, when the first cooler 100 is operated, the intercooler valve 150 may be open. Therefore, some of the transmission oil discharged from the transmission oil cooler 110 is introduced into the first cooler 100 through the second transmission oil inflow channel 141 in the second transmission oil channel 140. Next, the transmission oil heated in the first cooler 100 is introduced into the first transmission oil outflow channel 132 through the second transmission oil outflow channel 142 in the second transmission oil channel 140.

The hybrid intercooler system using multiple cooling media may include: a cooling radiator 220 configured to cool cooling water supplied into an engine 210 and the second cooler 200; a cooling water channel 230 configured to include a cooling water inflow channel 231 connecting the cooling radiator 220 to the second cooler 200 and communicating between an outlet of the cooling radiator 220 and an inlet of the second cooler 200 and a cooling water outflow channel 232 communicating between an outlet of the cooler 200 and an inlet of the cooling radiator 220; and an intercooler water pump 240 configured to be discharged in a channel through which the cooling water is supplied from the cooling radiator 220 to the second cooler 200 in the cooling water channel 230 to supply the cooling water to the second cooler 200.

That is, independent of whether the second cooler 200 is operated, the cooler cooled in the cooling radiator 220 may be introduced into the engine 210 and the cooling water heated in the engine 210 may be again introduced into the cooling radiator. Further, when the second cooler 220 is operated, the intercooler water pump 240 may be operated and some of the cooling water cooled in the cooling radiator 220 may be introduced into the second cooler 200 through the cooling water inflow channel 231 in the cooling water channel 230. Next, the cooling water heated in the second cooler 200 may be introduced into the cooling radiator 200 through the cooling outflow channel 232.

The hybrid intercooler system using multiple cooling media may include: a supercharged air temperature detector 410 configured to measure the temperature of the supercharged air at the outlet of the third cooler 300; a transmission oil temperature detector 420 configured to measure the temperature of the transmission oil discharged from the transmission oil cooler 110; a cooling water temperature detector 430 configured to measure the temperature of the cooling water discharged from the cooling radiator 220; and a controller 500 configured to control whether to open or close the intercooler valve 150 and whether to operate the intercooler water pump 240 according to the information measured by the supercharged air temperature detector 410, the transmission oil temperature detector 420 and the cooling water temperature detector 430. That is, the controller 500 may control the opening and closing of the intercooler valve 150 and the operation of the intercooler water pump 240 according to the method of controlling a hybrid intercooler system using multiple cooling media to be described below based on temperature values obtained by measuring the temperature of the supercharged air, the temperature of the transmission oil and the temperature of the cooling water.

Figure 3:
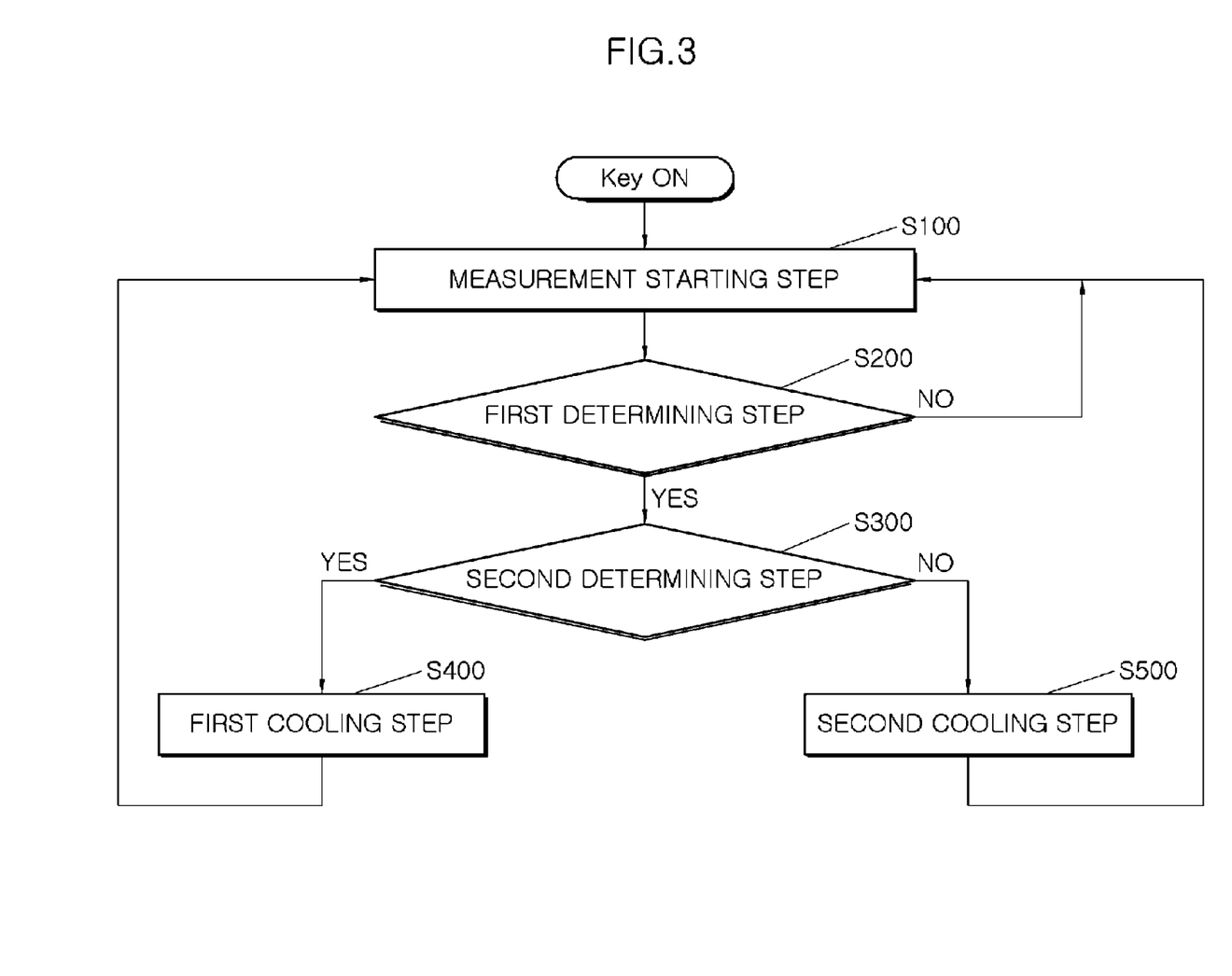
FIG. 3 is a flow chart of a method for controlling a hybrid intercooler system using multiple cooling media according to another exemplary embodiment of the present disclosure.
Figure 4A:
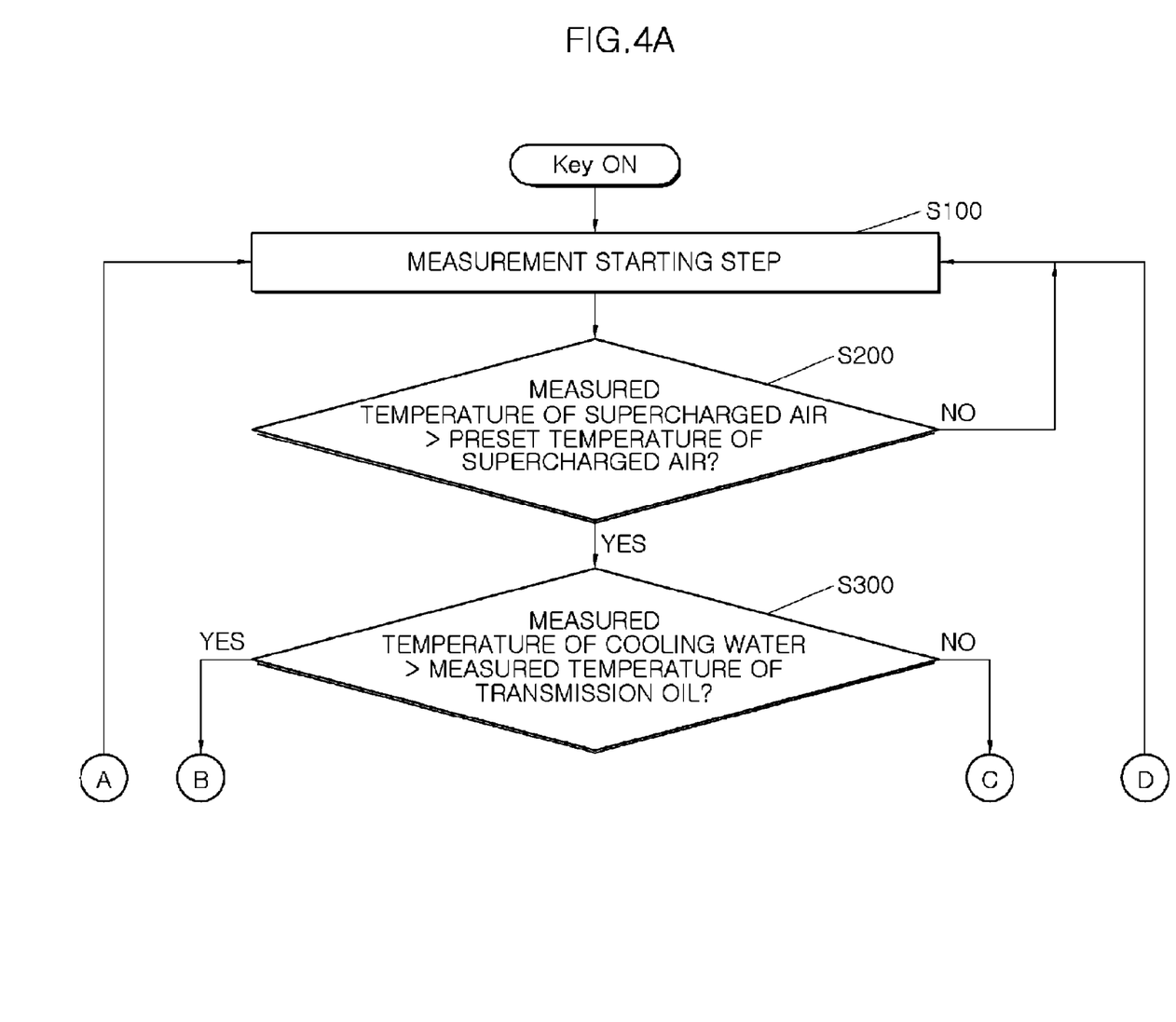
FIGS. 4A-4C are sections of a flow chart of a method for controlling a hybrid intercooler system using multiple cooling media according to an embodiment of the method shown in FIG. 3.
Figure 4B:
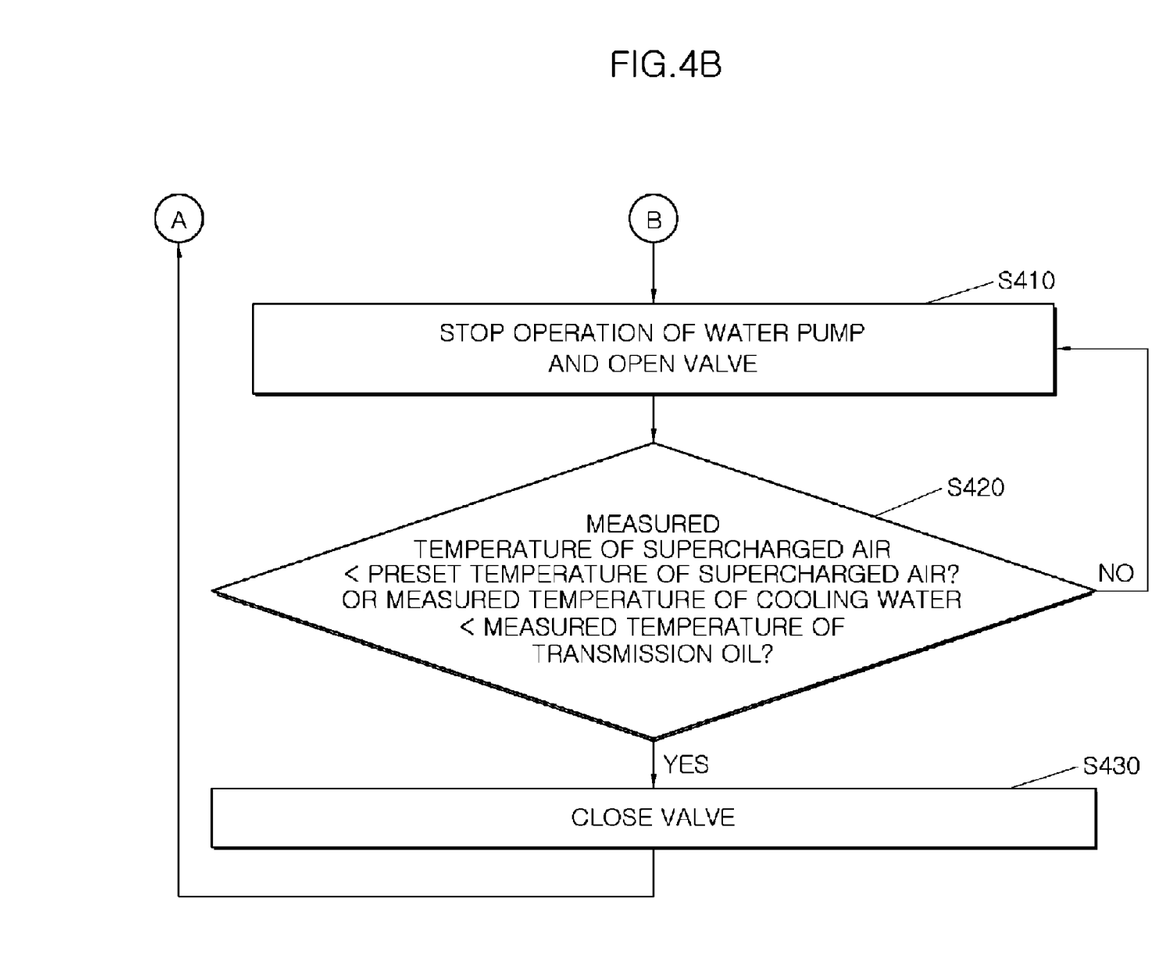
Figure 4C:
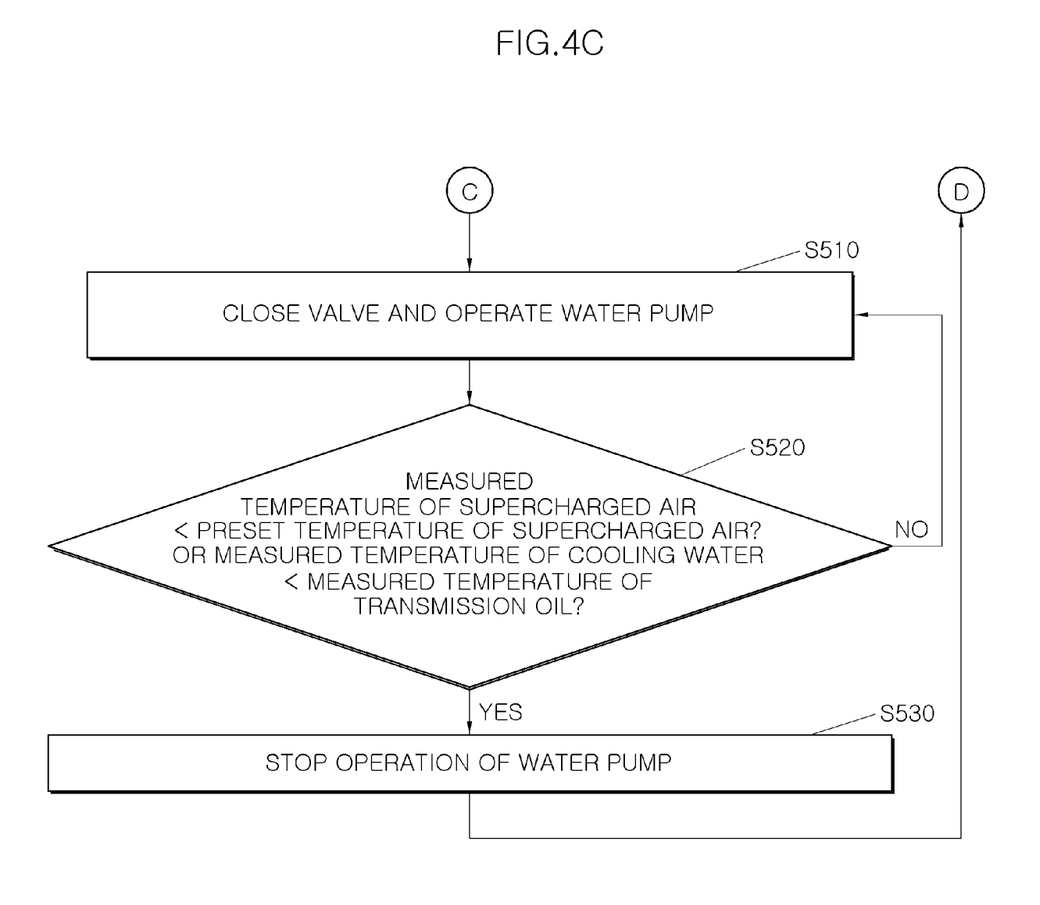

FIGS. 3 to 4C are flow charts of a method of controlling a hybrid intercooler system using multiple cooling media according to another exemplary embodiment of the present disclosure. Referring to FIGS. 3 to 4C, the method of controlling a hybrid intercooler system using multiple cooling media according to another exemplary embodiment of the present disclosure may include a measurement starting step (S100), a first determining step (S200), a second determining step (S300), a first cooling step (S400) and a second cooling step (S500).

In the measuring starting step (S100), the temperature of the supercharged air at the outlet of the third cooler 300, the temperature of the transmission oil discharged from the transmission oil cooler 110 and the temperature of the cooling water discharged from the cooling radiator 220 start to be measured. That is, the supercharged air temperature detector 410, the transmission oil temperature detector 420 and the cooling water temperature detector 430 start to measure the corresponding temperatures. This is to determine whether there is a need to increase cooling efficiency of the intercooler and whether to cool the intercooler using one or more of the transmission oil and the cooling water.

In the first determining step (S200), it may be determined whether the temperature of the supercharged air at the outlet of the third cooler 300 exceeds a preset temperature of the supercharged air. That is, it may be determined whether the operation of the first cooler 100 or the second cooler 200 is required by determining whether there is a need to increase the cooling efficiency of the intercooler. When the temperature of the supercharged air at the outlet of the third cooler 300 does not exceed the preset temperature of the supercharged air, the operation of the first cooler 100 and the second cooler 200 is not required and therefore only the third cooler 300 cools the supercharged air. The preset temperature of the supercharged air may be differently set depending on models, performance, etc., of various vehicles.

In the second determining step (S300), when the temperature of the supercharged air at the outlet of the third cooler 300 exceeds the preset temperature of the supercharged air, it may be determined whether the temperature of the cooling water exceeds the temperature of the transmission oil. That is, it is determined whether cooling the intercooler by which of one or more of the transmission oil and the cooling water the intercooler increases the cooling efficiency.

In the first cooling step (S400), if it is determined that the temperature of the cooling water discharged from the cooling radiator 200 exceeds the temperature of the transmission oil discharged from the transmission oil cooler 110, the transmission oil cools the supercharged air. Generally, the temperature of the transmission oil is set to be approximately 70° C. while a vehicle drives. Therefore, when the temperature of the transmission oil is lower than the temperature of the cooling water, the transmission oil may be used to cool the intercooler, and as a result, the cooling efficiency of the intercooler may be maximized.

The first cooling step (S400) may include: a step (S410) of circulating transmission oil to the first cooler 100 by stopping an operation of the intercooler water pump 240 and opening the intercooler valve 150; a third determining step (S420) of circulating transmission oil to the first cooler 100 and then determining whether a temperature of the supercharged air at the outlet of the third cooler 300 is less than a preset temperature of the supercharged air or whether a temperature of the cooling water discharged from the cooling radiator 220 is less than a temperature of a transmission oil discharged from the transmission oil cooler 110; and a step (S430) of stopping circulating the transmission oil to the first cooler 100 by closing the intercooler valve 150 if it is determined that the temperature of the supercharged air at the outlet of the third cooler 300 is less than the preset temperature of the supercharged air or that the temperature of the cooling water discharged from the cooling radiator 220 is less than the temperature of the transmission oil discharged from the transmission oil cooler 110.

That is, the transmission oil is circulated to the first cooler 100 to cool the intercooler (S410), it is then determined whether the supercharged air is sufficiently cooled and it is subsequently determined whether cooling the intercooler using the cooling water is more efficient (S420). In this case, the operation of the first cooler 100 is stopped (S430).

In the second cooling step (S500), when the temperature of the cooling water discharged from the cooling radiator 200 does not exceed the temperature of the transmission oil discharged from the transmission oil cooler 110, the cooling water cools the supercharged air. Generally, the low-temperature cooling water inside the cooling radiator 220 is maintained at about 80° C. while a vehicle drives. Therefore, the second cooler 200 cools high-temperature intake air to be an intermediate temperature, thereby maximizing the cooling efficiency of the intercooler.

The second cooling step (S500) may include: a step (S510) of circulating the cooling water to the second cooler 200 by closing the intercooler valve 150 and operating the intercooler water pump 240; a fourth determining step (S520) of circulating the cooling water to the second cooler 200 and then determining whether the temperature of the supercharged air at the outlet of the third cooler 300 is less than the preset temperature of the supercharged air or whether the temperature of the cooling water discharged from the cooling radiator 220 exceeds the temperature of the transmission oil discharged from the transmission oil cooler 110; and a step (S530) of stopping circulating the cooling water to the second cooler 200 by stopping the operation of the intercooler water pump 240 if it is determined that the temperature of the supercharged air at the outlet of the third cooler 300 is less than the preset temperature of the supercharged air or that the temperature of the cooling water discharged from the cooling radiator 220 exceeds the temperature of the transmission oil discharged from the transmission oil cooler 110.

That is, the cooling water may be circulated to the second cooler 200 to cool the intercooler (S510), it is then determined whether the supercharged air is sufficiently cooled and it is then determined whether cooling the intercooler using the transmission oil is more efficient (S520). In this case, the operation of the second cooler 200 may be stopped (S530).

As described above, according to the exemplary embodiments of the present disclosure, it is possible to maximize engine power and fuel efficiency performance by maximizing the cooling efficiency of the intercooler using the air cooling part while stabilizing the temperature of intake air passing through the intercooler inlet using the water cooling part.

Further, it is possible to reduce knocking by providing a stable intake air temperature to the combustion chamber of the engine.

Further, it is possible to reduce air resistance to improve fuel efficiency and increase freedom of design by reducing the opening part of the bumper depending on the increase in cooling efficiency of the intercooler.

The foregoing exemplary embodiments are only examples to allow a person having ordinary skill in the art to which the present disclosure pertains (hereinafter, referred to as those skilled in the art) to easily practice the present disclosure. Accordingly, the present disclosure is not limited to the foregoing exemplary embodiments and the accompanying drawings, and therefore, a scope of the present disclosure is not limited to the foregoing exemplary embodiments. Accordingly, it will be apparent to those skilled in the art that substitutions, modifications and variations can be made without departing from the spirit and scope of the disclosure as defined by the appended claims and can also belong to the scope of the disclosure.

What is claimed is:
1. A hybrid intercooler system using multiple cooling media, comprising:
   a first cooler for cooling air supercharged in a turbocharger using transmission oil;
   a second cooler for cooling the supercharged air passing through the first cooler using cooling water;
   a third cooler for cooling the supercharged air passing through the second cooler using outdoor air;
   a transmission oil cooler for cooling the transmission oil supplied into the first cooler; and
   a first transmission oil channel for connecting the transmission oil cooler to a transmission including an oil pump, and further including a first transmission oil inflow channel communicating between an outlet of the transmission oil cooler and an inlet of the transmission, and a first transmission oil outflow channel communicating between an outlet of the transmission and an inlet of the transmission oil cooler.

2. The hybrid intercooler system of claim 1, further comprising:
   a second transmission oil channel branched from the first transmission oil channel to connect the transmission oil cooler to the first cooler, and further including a second transmission oil inflow channel communicating between the first transmission oil inflow channel and an inlet of the first cooler; and a second transmission oil outflow channel communicating between an outlet of the first cooler and the first transmission oil outflow channel.

3. The hybrid intercooler system of claim 2, further comprising:
   an intercooler valve for opening and closing a channel through which the transmission oil is introduced from the transmission oil cooler to the first cooler in the second transmission oil channel.

4. The hybrid intercooler system of claim 3, further comprising:
a cooling radiator for cooling the cooling water supplied into an engine and the second cooler.

5. The hybrid intercooler system of claim 4, further comprising:
a cooling water channel including a cooling water inflow channel communicating between an outlet of the cooling radiator and an inlet of the second cooler, and a cooling water outflow channel communicating between an outlet of the second cooler and an inlet of the cooling radiator.

6. The hybrid intercooler system of claim 5, further comprising:
an intercooler water pump disposed in a channel through which the cooling water is supplied from the cooling radiator to the second cooler in the cooling water channel to supply the cooling water to the second cooler.

7. The hybrid intercooler system of claim 6, further comprising:
a supercharged air temperature detector for measuring a temperature of the supercharged air at an outlet of the third cooler.

8. The hybrid intercooler system of claim 7, further comprising:
a transmission oil temperature detector for measuring a temperature of the transmission oil discharged from the transmission oil cooler.

9. The hybrid intercooler system of claim 8, further comprising:
a cooling water temperature detector for measuring a temperature of the cooling water discharged from the cooling radiator.

10. The hybrid intercooler system of claim 9, further comprising:
a controller for controlling whether to open and close the intercooler valve and whether to operate the intercooler water pump according to information measured by the supercharged air temperature detector, the transmission oil temperature detector and the cooling water temperature detector.

* * * * *